(12) United States Patent
Eisele et al.

(10) Patent No.: US 9,709,677 B2
(45) Date of Patent: *Jul. 18, 2017

(54) OPTICAL DISTANCE MEASURING DEVICE

(71) Applicant: Robert Bosch GmbH, Stuttgart (DE)

(72) Inventors: Andreas Eisele, Leinfelden-Echterdingen (DE); Oliver Wolst, Singapore (SG); Bernd Schmidtke, Leonberg (DE)

(73) Assignee: Robert Bosch GmbH, Stuttgart (DE)

( * ) Notice: Subject to any disclaimer, the term of this patent is extended or adjusted under 35 U.S.C. 154(b) by 404 days.

This patent is subject to a terminal disclaimer.

(21) Appl. No.: 14/309,462

(22) Filed: Jun. 19, 2014

(65) Prior Publication Data

US 2015/0293226 A1   Oct. 15, 2015

Related U.S. Application Data

(63) Continuation of application No. 13/395,265, filed as application No. PCT/EP2010/060523 on Jul. 21, 2010, now Pat. No. 8,773,642.

(30) Foreign Application Priority Data

Sep. 11, 2009   (DE) .......... 10 2009 029 364

(51) Int. Cl.
*G01S 17/10* (2006.01)
*G01C 3/08* (2006.01)
(Continued)

(52) U.S. Cl.
CPC ............ *G01S 17/10* (2013.01); *G01C 3/08* (2013.01); *G01C 15/002* (2013.01); *G01S 7/4816* (2013.01); *G01S 7/4863* (2013.01)

(58) Field of Classification Search
CPC . G01C 3/08; G01S 7/491; G01S 17/89; G01S 17/36; G01S 7/493
See application file for complete search history.

(56) References Cited

U.S. PATENT DOCUMENTS

| | | |
|---|---|---|
| 7,301,608 B1 | 11/2007 | Mendenhall et al. |
| 2002/0093638 A1* | 7/2002 | Seifert ............. G01C 3/08 356/4.01 |

(Continued)

FOREIGN PATENT DOCUMENTS

| | | |
|---|---|---|
| CN | 101405565 A | 4/2009 |
| DE | 199 36 847 A1 | 2/2000 |

(Continued)

OTHER PUBLICATIONS

Niclass, Cristiano L. Single-Photon Image Sensors in CMOS: Picosecond Resolution for Three-Dimentional Imaging. General Classification of Optical 3-D Image Sensors. Jul. 29, 2008. 1-251 (260 pages). Lausanne, Switzerland.

(Continued)

*Primary Examiner* — Luke Ratcliffe
(74) *Attorney, Agent, or Firm* — Maginot, Moore & Beck LLP

(57) ABSTRACT

A measuring device for optically measuring a distance to a target object including an emitter device for emitting an optical measuring beam to the target object, a capturing device comprising a detection surface for detecting an optical beam returned by the target object, and an evaluation device. The detection surface has a plurality of pixels, each pixel having at least one light-sensitive element and each of the plurality of pixels is connected to the evaluation device. The emitting device and the capturing device are configured in such a manner that the optical measurement beam returned by the target object simultaneously illuminates a plurality of pixels. The evaluation device is configured in (Continued)

such a manner that detection signals of a plurality of pixels are guided to at least one of the plurality of distance determining devices.

20 Claims, 5 Drawing Sheets

(51) Int. Cl.
*G01C 15/00* (2006.01)
*G01S 7/481* (2006.01)
*G01S 7/486* (2006.01)

(56) References Cited

U.S. PATENT DOCUMENTS

| | | |
|---|---|---|
| 2003/0128351 A1 | 7/2003 | Schmidt et al. |
| 2006/0175529 A1 | 8/2006 | Harmon et al. |
| 2007/0182949 A1* | 8/2007 | Niclass .................. G01C 3/08 356/3 |
| 2009/0046270 A1 | 2/2009 | Hartman et al. |
| 2009/0303457 A1 | 12/2009 | Lancaster et al. |

FOREIGN PATENT DOCUMENTS

| | | |
|---|---|---|
| DE | 10 2006 013 290 A1 | 9/2007 |
| DE | 10 2006 049 935 A1 | 4/2008 |
| DE | 10 2007 003 024 A1 | 7/2008 |

OTHER PUBLICATIONS

Stoppa, David; Pancheri, Lucio; Scandiuzzo, Mauro; Gonzo, Lorenzo; Betta, Gian-Franco Dalla; Simoni, Andrea. A CMOS 3-D Imager Based on Single Photon Avalanche Diode. IEEE Transactions on Circuits and Systems. Jan. 1, 2007. 4-12. vol. 54: 1 (9 pages). IEEE. Trento, Italy.

Stoppa, David; Pancheri, Lucio; Scandiuzzo, Mauro; Malfatti, Mattia; Pedretti, Gianmaria; Gonzo, Lorenzo. A 64-Pizel 3-D Imager Based on Single Photon Avalanche Diodes. Solid-State Circuits Conference. 2005. 487-490 (5 pages). IEEE.

Borghetti, Fausto; Mosconi, Daniel; Pacheri, Lucio; Stoppa, David. A CMOS Single-Photon Avalanche Diode Sensor for Fluorescence Lifetime Imaging. 2007 International Image Sensor Workshop. 250-253 (20 pages). IEEE. Ogunquit, Maine, USA.

International Search Report corresponding to PCT Application No. PCT/EP2010/060523, mailed Nov. 11, 2010 (German and English language document) (5 pages).

* cited by examiner

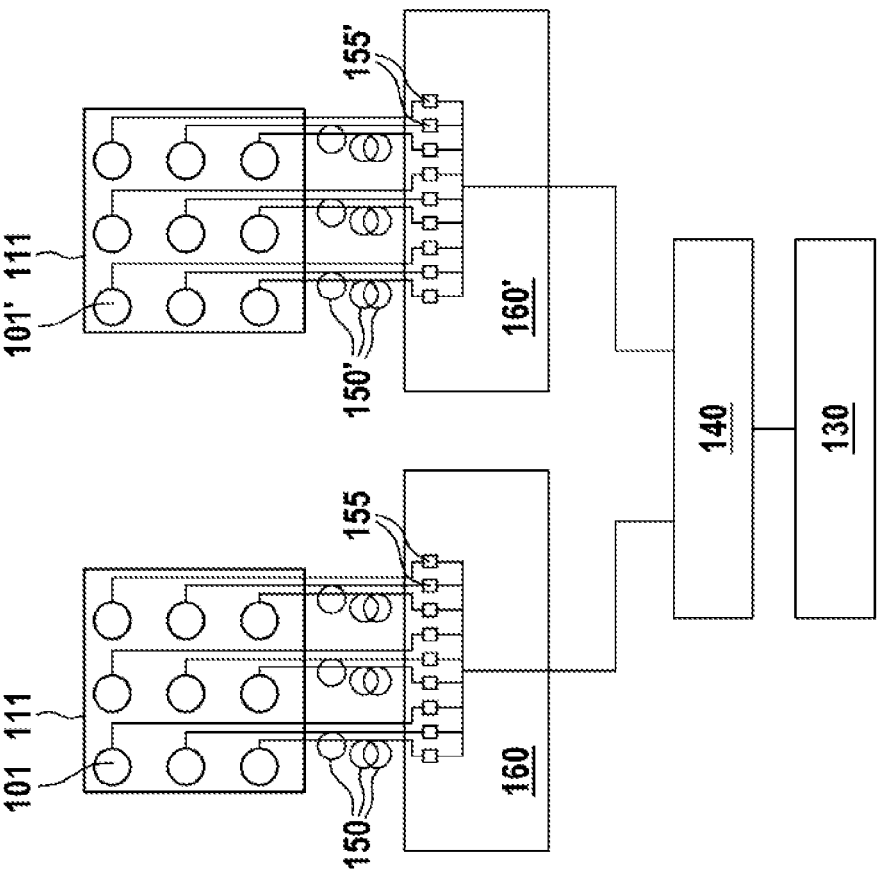

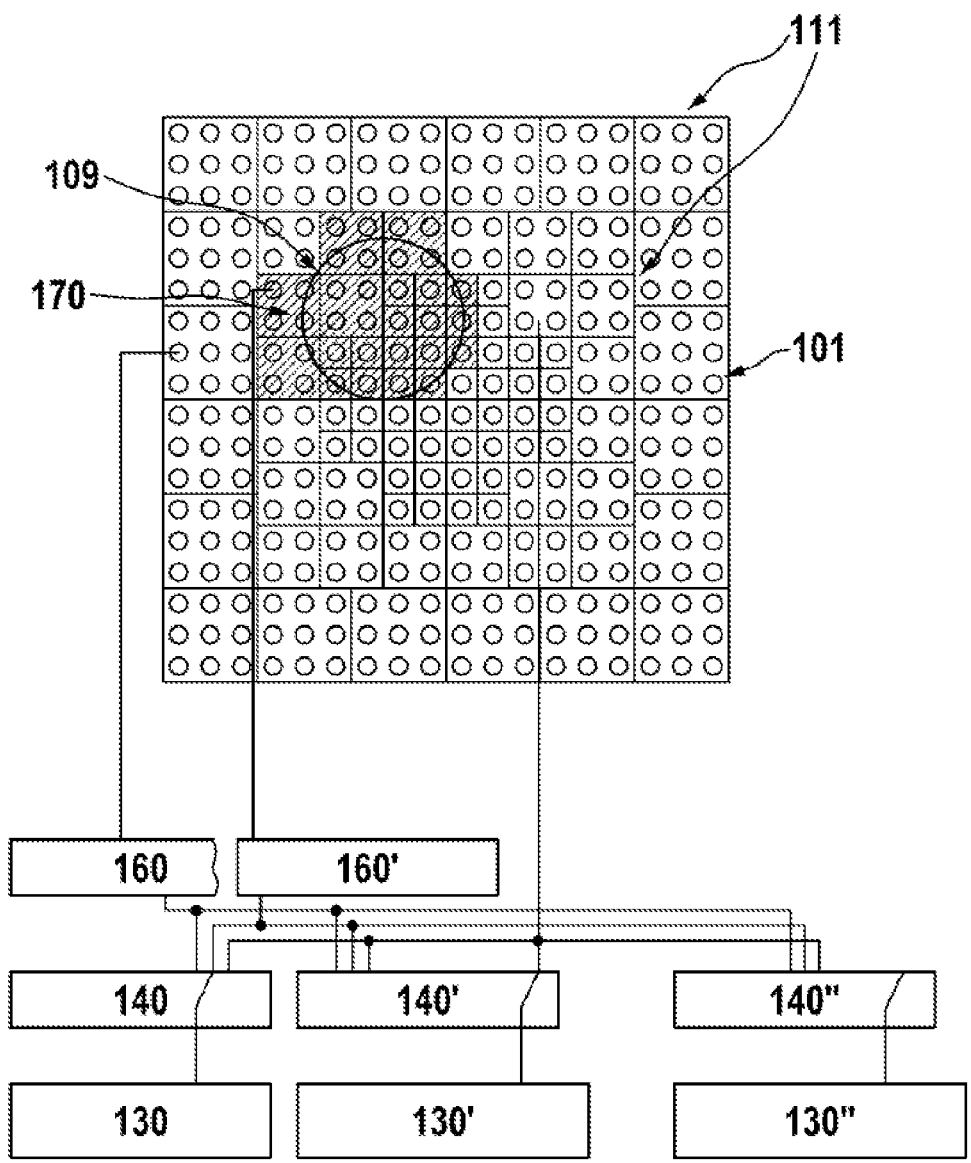

OPTICAL DISTANCE MEASURING DEVICE

This application is a continuation of U.S. application Ser. No. 13/395,265, filed on Jul. 3, 2012, which in turn is a 35 U.S.C. §371 National Stage application of PCT/EP2010/060523, filed on Jul. 21, 2010, which in turn claims the benefit of priority to Serial No. DE 10 2009 029 364.7, filed on Sep. 11, 2009 in Germany, the disclosures of which are incorporated herein by reference in their entirety.

BACKGROUND

The disclosure relates to a measuring device for measuring a distance between the measuring device and a target object with the aid of optical measurement radiation.

Optical distance measuring devices are known which align a temporally modulated light beam in the direction toward a target object whose distance from the measuring device is intended to be determined. The returning light reflected or scattered from the target object aimed at is at least partly detected by the device and used for determining the distance to be measured. In this case, a typical measurement range is in a range of distances from a few centimeters up to several 100 meters.

In order to be able to measure the distance from the target object using a light beam, the light beam is temporally modulated in terms of its intensity, for example. By way of example light pulses can be emitted and a propagation time of a light pulse from emission until detection can be measured and the distance from the target object can be calculated therefrom. For this purpose, however, very short light pulses have to be emitted and very fast detection electronics have to be used in order to be able to obtain sufficiently accurate measurement results. Alternatively, a light beam can be temporally periodically modulated in terms of its intensity and a phase shift between the emitted light signal and the detected light signal can be used to determine the propagation time and thus the distance from the target object. The principle of laser distance measurement is generally known by the designation "Time of Flight Ranging" for example with continuous modulation of the intensity of the light beam.

Furthermore, so-called three-dimensional (3D) cameras are known in which, in addition to an optical imaging of an object to be captured, the respective distance between a region on the surface of the object to be captured and the camera is also intended to be detected. For this purpose, the camera has an imaging optical unit that projects an image of the object sharply onto a surface of a detector arranged behind it. In this case, the detector has a multiplicity of pixels arranged in a matrix-like fashion. In this case, each of the pixels can determine image information such as, for example, a color or light intensity of the light reflected from a surface region of the target object. In addition, information about a distance between the camera and the corresponding surface region of the target object can be determined. For this purpose, the target object can be illuminated with temporally modulated laser radiation and the radiation reflected back from the target object and imaged onto the detector with the aid of an imaging optical unit can be used, by determining the time of flight, to determine spatially resolved information about distances from the respective surface regions of the target object.

However, in addition to a spatially resolving detector having a multiplicity of pixels, such a three-dimensional camera also requires an imaging optical unit in order to image each surface region of the target object precisely onto a pixel, wherein the detection signal determined from said pixel can then be used for determining the distance from the respective surface region. This requires a comparatively complicated focusing optical unit and the possibility of individual evaluation of detection signals of each of the pixels.

In contrast thereto, simple distance measuring devices are used only for determining a distance between the measuring device and the target object or a point on the target object sighted by means of a laser beam. In this case, the distance does not need to be determined in a spatially resolved manner. It generally suffices to determine an averaged distance. Such distance measuring devices are often used in handheld devices in order to determine within a room, for example, the distance from a specific location to surrounding target objects such as, for example, walls or items of furniture. In this case, a handheld distance measuring device should preferably have a construction that is as simple, robust and cost-effective as possible, and should allow simple operation.

DE 10 2006 013 290 A1 discloses a device for optical distance measurement in which a detector of a receiving unit has a plurality of light-sensitive areas which are separated from one another and which can be activated separately from one another. In this case, each of the light-sensitive areas has a photodiode, for example a PIN diode or an APD (Avalanche Photo Diode), or a CCD chip as light-sensitive element. These light-sensitive elements determine an analog detection signal corresponding to an intensity of the received light. The light-sensitive areas can be selectively activated and combined in this way to form a total detection area which can be matched as well as possible to a partial region of the detector area that is illuminated by a light source, in order in this way to improve a signal-to-noise ratio.

SUMMARY

There may be a need for a measuring device for optical distance measurement which, particularly in comparison with the conventional distance measuring devices described above, permits a simplified construction of electronic components used therein, in particular of evaluation components for evaluating detection signals.

Furthermore, there may be a need for a distance measuring device which has as far as possible at least one of the following advantages:

expansion of an adjustment tolerance of a receiving optical unit of the distance measuring device relative to a detector;

reduction of a complexity and requirements made of a receiving optical unit;

increase in a dynamic range particularly in the measurement of small distances;

optimization of a signal-to-noise ratio particularly in the measurement of large distances; and/or reduction of chip area of an integrated circuit that is required for the evaluation.

The measuring device for optical distance measurement according to the disclosure comprises a transmitting unit for emitting optical measurement radiation toward a target object, a receiving unit having a detection area for detecting optical measurement radiation returning from the target object, and an evaluation unit having a plurality of distance determining units. In this case, the detection area of the receiving unit has a multiplicity of pixels, wherein each pixel has at least one light-sensitive element. Each of the multiplicity of pixels is connected to the evaluation unit directly or indirectly via further interposed components. The evaluation unit is designed in such a way that detection signals of a plurality of pixels are forwarded to at least one of the plurality of distance determining units, on the basis of which the respective distance determining unit determines distance data which correlate with the distance between the measuring device and the target object. The evaluation unit is designed to determine a distance between the measuring device and the target object on the basis of an evaluation of distance data that were determined by the plurality of distance determining units.

The transmitting unit can be a light source, for example in the form of an LED, a laser or a laser diode, which emits light in a temporally modulated fashion toward the target object. In this case, the temporal modulation can be effected continuously and/or periodically, for example sinusoidally. It is also possible to emit pulse trains, for example non-periodically such as e.g. in the form of so-called pseudo noise pulse sequences.

In this case, each of the pixels can be connected to the evaluation unit directly or, for example, with the interposition of a multiplexer designed to selectively forward detection signals of a plurality of pixels. What can be achieved in this way, for example, is that detection signals of individual pixels or of a group of pixels can be evaluated by the evaluation unit independently of detection signals of other pixels.

The transmitting unit and the receiving unit are preferably designed and coordinated with one another in such a way that optical measurement radiation returning from the target object under normal measurement conditions, that is to say, for example, in the case of measurement distances of from a few centimeters up to a few 100 meters, simultaneously are illuminated a plurality of pixels. In this case, however, unlike in conventional 3D cameras, the fact that a plurality of pixels are illuminated simultaneously is not intended to be used to detect an image of the target object or a spatial resolution with regard to the distance from individual partial regions on a surface of the target object, but rather is intended, as explained in even more detail further below, to make possible, inter alia, advantages with regard to a detection sensitivity and/or an adjustment tolerance. In this case, the distance between the measuring device and the target object is determined on the basis of an evaluation of detection signals of a plurality of pixels, in particular of a plurality of the simultaneously illuminated pixels.

For this purpose, the transmitting unit can emit a measurement beam whose cross section is large enough that that proportion of the measurement beam which returns from the target object always illuminates a plurality of pixels. In order to concentrate the measurement radiation returning from the target object and to direct it onto the detection area, in order in this way to provide for a sufficiently strong detection signal, a simple optical unit, for example in the form of one or more lenses, can be provided within an optical path from the transmitting unit to the receiving unit. Said simple optical unit can be configured in a cost-saving and complexity-reducing manner as a non-automatically focusing optical unit ("fixed focus"). Since such a non-automatically focusing optical unit having a fixed focal length can focus a measurement beam returning from the target object onto the detection area of the receiving unit optimally, i.e. with a smallest spot diameter, only when the target object is situated at the object distance from the measuring device which corresponds to the focal length and image plane, the number of pixels which are illuminated simultaneously by measurement radiation returning from the target object can vary in a manner dependent on a distance between the target object and the measuring object. By way of example, the optimization of the optical receiving system for receiving measurement radiation from target objects far away with a large object distance can mean that focal length and image distance should be chosen such that the geometrical imaging condition is achieved for the large object distance. Consequently, at a large distance, it is possible to achieve the smallest spot diameter in the image plane ("the imaging is sharp"). By defining the focal length and image plane, it is possible for the number of pixels that are illuminated in the case of a target object situated closer to be significantly greater than in the case of a target object far away. In the case of a target object situated closer, the returning measurement radiation can no longer be imaged sharply, with the result that the illuminated region of the detection area can become correspondingly larger.

Since the detection signals of individual pixels can be evaluated independently of one another, the receiving unit and the evaluation unit can be designed to determine a distance between the measuring device and the target object on the basis of an evaluation of detection signals exclusively from pixels onto which light from that area of the target object which is illuminated by the transmitting unit is radiated back. In other words, the evaluation unit can firstly determine in an initial measurement, for example, which of the pixels of the detection area actually receive measurement radiation of the transmitting unit and which pixels merely detect background radiation, and can subsequently use for the actual distance determination only the detection signals of the pixels illuminated by the measurement radiation. As a result, a signal-to-noise ratio can be considerably increased.

In order to be able to determine the distance between the measuring device and the target object, the evaluation unit can have a plurality of distance determining unit (in some instances also known as "binning scheme"). A distance determining unit can be designed to determine data which correlate with the distance to be determined between the measuring device and the target object and from which therefore ultimately the desired distance can be determined. By way of example, it is possible to determine a time of flight of measurement radiation between an emission from the transmitting unit until a detection of the measurement radiation returning from the target object on the detection area and to determine the desired distance therefrom. For this purpose, the distance determining unit can compare information—provided by the transmitting unit—about the temporal modulation of emitted measurement radiation with detection signals provided by the receiving unit. In the case of a periodically modulated emitted measurement radiation, for example, a corresponding distance can be determined from the phase difference between an emission signal and a detection signal.

In principle, a single distance determining unit can suffice for determining a distance between the measuring device and the target object. In order to keep the number of distance determining units small, it can be advantageous to conduct the detection signals of individual pixels or of a group of pixels successively to a distance determining unit for example with the aid of a multiplexer. On account of such sequential processing of detection signals, a lengthening of a total measurement duration can occur. Alternatively, each of the pixels can be assigned a dedicated distance determining unit. In this case, a respective distance can be determined from each of the detection signals of the multiplicity of pixels, possibly temporally in parallel with one another, and, finally, from the multiplicity of distances determined, a distance between the device and the target object that is ultimately to be determined can be determined for example by averaging. However, this can necessitate providing a very large number of distance determining units in the measuring device, which can make the construction and the manufacture of the measuring device complicated.

As it were as a middle way between these two extreme alternatives, a plurality of pixels can be connected to a distance determining unit and the distance determining unit can therefore be designed to determine the distance-correlated data on the basis of detection signals of the plurality of pixels. The evaluation unit proposed here therefore has a plurality of distance determining units and can be designed to determine the distance between the measuring device and the target object on the basis of the distance-correlated data determined by the distance determining units, for example by averaging.

By using a plurality of distance determining units, it is possible to reduce the time required for finding the pixels that receive measurement radiation, since variable combinations of pixels can be evaluated in parallel by means of skillfully chosen selection algorithms.

The number of light-sensitive elements or the area of the individual light-sensitive elements contained in a pixel can be chosen in a variable fashion depending on the location of the pixel within the detection area of the receiving unit. By way of example, it may be known that the measurement radiation returning from the target object can impinge on the detection area of the receiving unit at a different position and/or with a different cross-sectional area depending on the distance between the target object and the measuring device. The number or the area of light-sensitive elements within a pixel can accordingly be adapted in a location-dependent manner to the impinging light intensity to be expected. By adapting the areas of the light-sensitive elements and/or number of light-sensitive elements within a pixel, it is possible to optimize a dynamic range of the measuring device. By adapting the pixel areas to a laser spot size, it is possible to optimize a signal-to-noise ratio.

If a non-automatically focusing optical unit designed to be imaging or optimally focusing for target objects far away is arranged for example in the light path between the transmitting unit and the receiving unit, for target objects far away the returning measuring radiation can be focused with a small spot diameter. Within such a region of the detection area it can be advantageous for each of the pixels to contain only a single light-sensitive element or only a few light-sensitive elements. If target objects situated closer are sighted by means of such a fixed-focus measuring device, the returning measurement radiation cannot be focused on the detection area as a small spot, but rather impinges possibly in a defocused fashion on a larger partial area of the detection area. Overall, in this case, more pixels are then illuminated than in the case of a target object situated far away. Therefore, it can be advantageous, in edge regions of the illuminated partial region of the detection area, in each case to combine a plurality of light-sensitive elements to form an individual pixel (or "sub-array" or "cluster").

By way of example, the transmitting unit and the receiving unit can be arranged alongside one another along a parallax axis. Such so-called biaxial measuring systems can have the advantage that there is no need for complex radiation splitting for selecting the returning measurement beam. In this case, the measurement beam emitted by the transmitting unit and returning from the target object can impinge on the detection area at a different location along the parallax axis and have different cross sections depending on the distance of the target object. In this case, it can be advantageous to vary the number of light-sensitive elements contained in a pixel depending on the location of the pixel along the parallax axis. In particular, it can be advantageous to choose the number of light-sensitive elements contained in a pixel to be smaller in pixels near the transmitting unit than in pixels remote from the transmitting unit.

Alternatively, the transmitting unit and the receiving unit can be arranged coaxially with respect to one another. In the case of such a monoaxial measuring device, what can be achieved with the aid of semitransparent mirrors, for example, is that the center of that region of the detection area which is illuminated by the returning radiation remains largely location-constant independently of the distance of the target object. However, the cross section of the illuminated region on the detection area can still depend on the distance of the target object. A small illuminated spot can occur in the case of target objects far away and an optical unit having a long focal length, and a larger illuminated spot can occur in the case of target objects situated closer. It can be advantageous to choose the number of light-sensitive elements contained in a pixel to be smaller in pixels near the center of the detection area than in pixels remote from the center of the detection area.

Possible aspects, advantages and configurations of the disclosure have been described above with reference to individual embodiments of the disclosure. The description, the associated figures and the claims contain numerous features in combination. A person skilled in the art will also consider these features, in particular also the features of different exemplary embodiments, individually and combine them to form expedient further combinations.

BRIEF DESCRIPTION OF THE DRAWINGS

Embodiments of the disclosure and partial aspects contained therein are described below with reference to the accompanying figures. The figures are merely schematic and not true to scale. Identical or similar reference symbols in the figures designate identical or similar elements.

FIG. 5 shows an individual light-sensitive element connected to a distance determining unit.

FIG. 6 shows two light-sensitive elements connected to a distance determining unit via a multiplexer.

FIG. 7 shows two pixels each having 9 light-sensitive elements, which are connected to a distance determining unit via combiners and multiplexers.

FIG. 8 shows a detection area of a receiving unit with pixels in which the number of light-sensitive elements contained in the pixels varies in a location-dependent manner and which are connected to a plurality of distance determining units via combiners and multiplexers.

DETAILED DESCRIPTION

Figure 1:
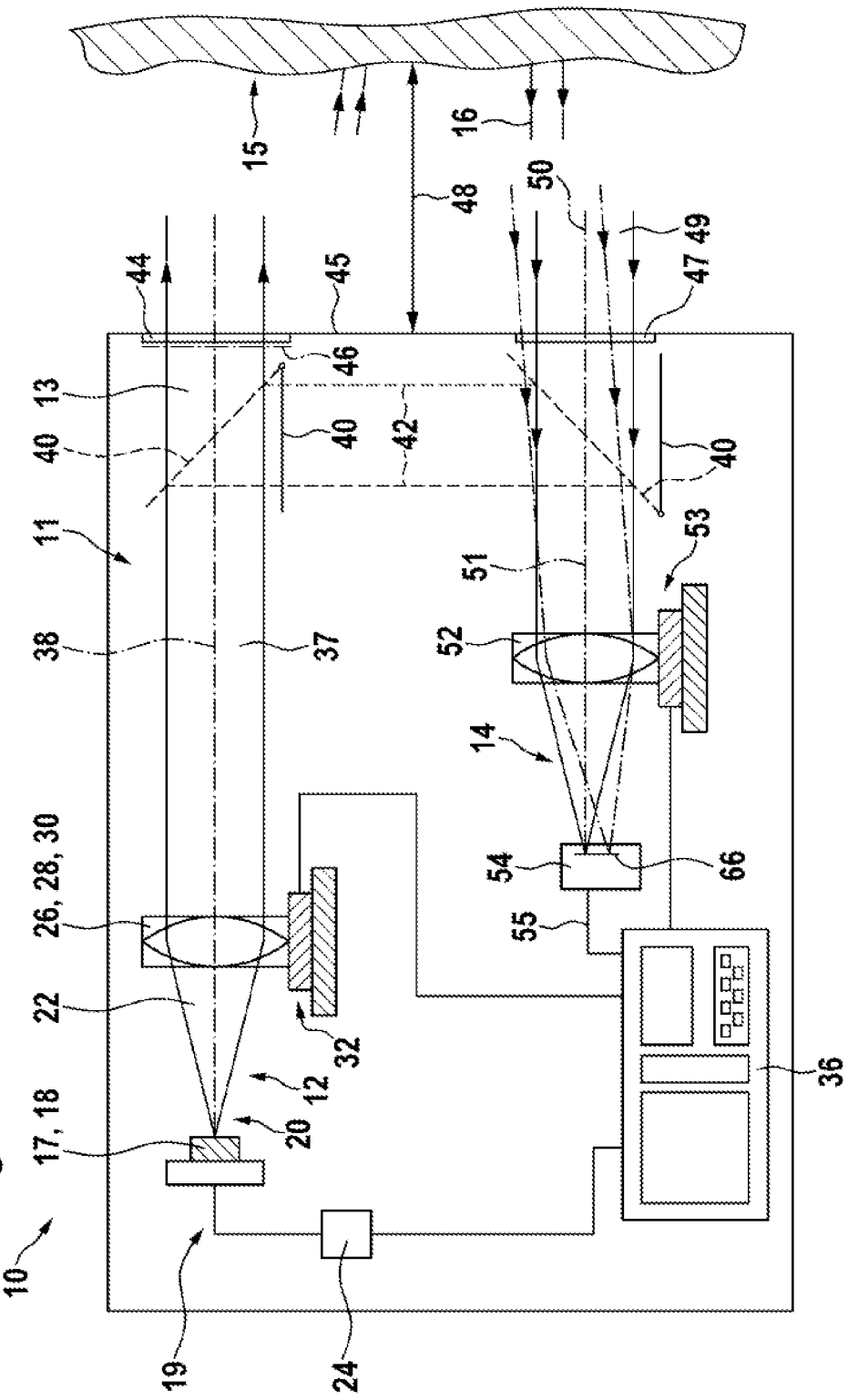
FIG. 1 shows a measuring device for optical distance measurement in accordance with one embodiment of the present disclosure.

FIG. 1 schematically illustrates a measuring device 10 for optical distance measurement according to the disclosure with the most important components for describing its function.

The measuring device 10 comprises a housing 11, in which a transmitting unit 12 for emitting optical measurement radiation 13 and a receiving unit 14 for detecting measurement radiation 16 returning from a target object 15 are arranged.

The transmitting unit 12 comprises a light source, which is realized by a semiconductor laser diode 18 in the exemplary embodiment illustrated. The laser diode 18 emits a laser beam 20 in the form of a light bundle 22 visible to the human eye. For this purpose, the laser diode 18 is operated by means of a control unit 24, which, by means of corresponding electronics, generates a temporal modulation of an electrical input signal 19 of the laser diode 18. What can be achieved by such modulation of the diode current is that the optical measurement radiation 13 utilized for distance measurement is likewise modulated temporally in terms of its intensity in a desired manner.

The laser beam bundle 20 subsequently passes through a collimation optical unit 26 in the form of an objective 28, which is illustrated in the form of an individual lens in a simplified manner in FIG. 1. In this exemplary embodiment, the objective 28 is optionally situated on an adjusting assembly 32, which, in principle, makes it possible to change the position of the objective in all three spatial directions, for example for alignment purposes. Alternatively, however, the collimation optical unit 26 can also already be part of the laser diode 18 or fixedly connected thereto.

After passing through the objective 28, this results in a, for example amplitude-modulated, signal of the measurement radiation 13 in the form of an almost parallel light bundle 37, which propagates along an optical axis 38 of the transmitting unit 12.

In addition, a preferably switchable beam deflector 40 can also be situated in the transmitting unit 12, and allows the measurement radiation 13 to be deflected wholly or partly whilst bypassing the target object 15 directly, that is to say device-internally, onto the receiving unit 14. In this way it is possible to generate a device-internal reference path 42, which allows calibration or adjustment of the measuring device.

If a distance measurement is carried out by means of the measuring device 10, the measurement radiation 13 leaves the housing 11 of the measuring device through an optical window 44 in the end wall 45 of the measuring device 10. The opening of the optical window 44 can be protected for example by a shutter 46. For the purpose of actual measurement, the measuring device 10 is then aligned toward a target object 15 whose distance 48 from the measuring device 10 is intended to be determined. The signal 16 reflected or scattered at the desired target object 15 forms returning optical measurement radiation 16 in the form of a returning beam bundle 49 or 50, a certain portion of which passes back into the measuring device 10 again.

Through an entrance window 47 at the end side 45 of the measuring device 10, the returning measurement radiation 16 is coupled into the measuring device 10 and then impinges, as illustrated in FIG. 1, on a receiving optical unit 52.

Two returning measurement beam bundles 49 and 50 for two different target object distances 48 are depicted for illustration by way of example in FIG. 1. For large object distances, where large can be interpreted as large relative to the focal length of the receiving optical unit 52, the optical measurement radiation 16 returning from the target object 15 is incident approximately parallel to the optical axis 51 of the receiving unit 14. This case is represented by the measurement beam bundle 49 in the exemplary embodiment in FIG. 1. As the object distance becomes smaller, the returning measurement radiation 16 incident in the measuring device is inclined more and more relative to the optical axis 51 of the receiving unit 14 on account of a parallax. The beam bundle 50 is depicted in FIG. 1 as an example of such a returning measurement beam bundle in the near range of the measuring device.

The receiving optical unit 52, which is likewise merely symbolized schematically by an individual lens in FIG. 1, focuses the beam bundle of the returning measurement radiation 16 onto the detection area 66 of a receiving detector 54 provided in the receiving unit 14. The detector 54 has a multiplicity of pixels for detecting the optical measurement radiation. Each of the pixels has at least one light-sensitive element. By means of the light-sensitive elements provided in the detection area 66, which are arranged individually or in groups in combination in pixels in a matrix-like manner and are connected to an evaluation unit 36, the incident returning measurement radiation 16 is converted into an electrical signal 55 and fed for further evaluation in the evaluation unit 36.

The detection signals generated by an individual light-sensitive element or a combination of light-sensitive elements can be fed to the distance determining units contained in an evaluation unit 36. A distance determining unit can sum the detection signals and generate therefrom a signal corresponding to a time-dependent intensity of the light signal impinging on the respective light-sensitive elements or the light intensity. By relating this signal to an excitation signal indicating the temporal profile of the photon rate emitted by the transmitting unit, it is possible to deduce a photon time of flight from the transmitting unit toward the target object and back again to the receiving unit. If the transmitting unit periodically modulates the emitted light sinusoidally, for example, it is possible to determine a time of flight from a phase difference between the emitted and detected measurement radiation.

Figure 2:
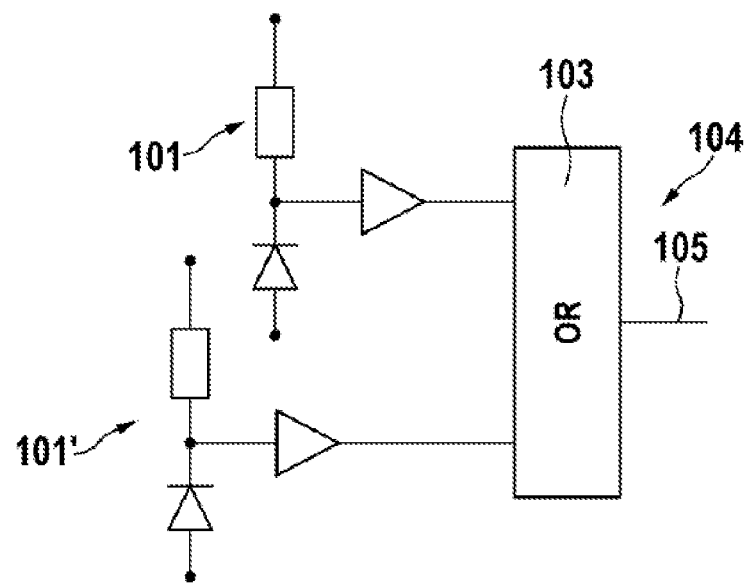
FIG. 2 shows a schematic circuit of two light-sensitive elements connected to a combiner, for a measuring device in accordance with one embodiment of the present disclosure.

FIG. 2 shows two light-sensitive element 101, 101', the detection signals of which are respectively forwarded to an OR gate 103. The OR gate 103 acts as a combiner 104 by taking up both detection signals from the first light-sensitive element 101 and detection signals from the second light-sensitive element 101' and outputting a combined signal of these input signals at an output 105.

Figure 3:
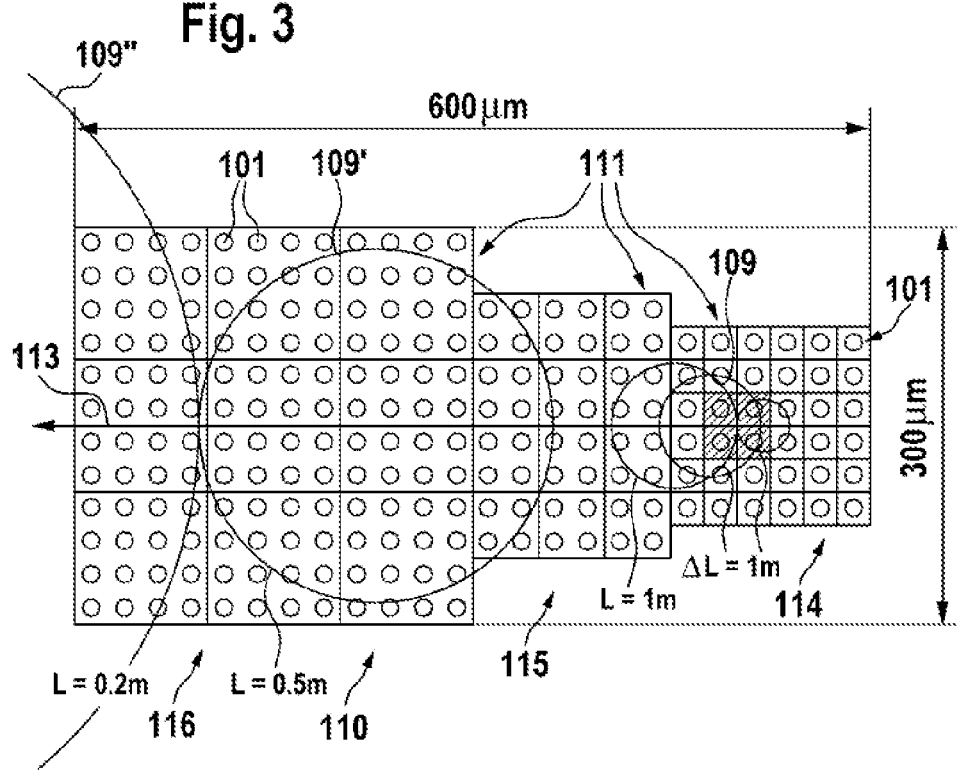
FIG. 3 shows a plan view of a detection area of a receiving unit for a measuring device in accordance with one embodiment of the present disclosure.

FIG. 3 schematically shows a detection area 110 of a detection unit 54 for a laser distance measuring device with uncorrected parallax. The illustration depicts circular laser spots 109, the diameter of which varies depending on a distances L between the measuring device and the target object, on the detection area 110. This assumes an ideal lens having a focal length f=30 mm, a diameter d=4 mm and a parallax of 5 mm for the case of optimum alignment with regard to large distances. The laser radiation was assumed to have a divergence of 1 mrad in this case. In this configuration of the detection area 110 it is advantageous that the size of the pixels 111 or the number of the light-sensitive elements 101 within respective pixels 111 increases along the parallax axis 113. In this case, the parallax axis is assumed to be the straight line of intersection between a detection area plane and a plane spanned by the optical axis of the receiving optical unit and the laser beam axis of the distance measuring device. It can be discerned that in a first region 114, in which the laser spot 109 impinges if the laser beam is radiated back from a target object far away, small pixels are provided which each contain only a single light-sensitive element. In a region 115, in which the laser spot 109' impinges if the target object is at a distance of approximately 0.5 to 1 m, larger pixels each having four light-sensitive elements are provided. In a further region 116, in which the laser spot 109" impinges for the case of very close target objects, particularly large pixels having 8 or 16 light-sensitive elements are provided. In this case, the receiving optical unit is optimized such that the best possible imaging quality, that is to say the smallest possible laser spot diameter on the detection area, is achieved for the largest distance of the target object.

In the case of large distances, the laser spot 109 is comparatively small on account of the sharp imaging. At the same time, the intensity—composed of returning measurement and background radiation—of the impinging light is comparatively low on account of the small proportion of the measurement radiation from the target object far away. In the case of target objects positioned closer, overall more measurement radiation is reflected or scattered from the target object back to the detection area 110. At the same time, the measurement radiation is no longer imaged sharply onto the detection area 110 by the fixed-focus receiving optical unit.

In total, for a geometrical consideration for a laser distance measuring device with a slightly divergent laser beam and a fixed-focus receiving optical unit for the proportion of the received laser radiation, a light intensity that decreases with the square of the distance arises in the detector plane in the case of large distances and a light intensity that is constant over the distance arises in the detector plane in the case of small distances. By contrast, the intensity proportion of the background radiation is distance-independent to a first approximation.

With a location-dependent configuration—as illustrated in FIG. 3—of the size of the pixels 101 contained in the detection area 110, what can be achieved, firstly, is that both in the case of large distances of the target object and in the case of small distances of the target object, a laser spot 109 in each case impinges on a plurality of pixels 111 and can be evaluated by the latter. The size of the active detection area can in this case be optimally adapted to the size of the laser spot and the signal-to-noise ratio can thus be optimized. Secondly, with such a location-dependent configuration, the dynamic range of the light-sensitive elements can also be optimally utilized, since the light intensity of the impinging light (laser proportion and background proportion) is lower in the case of large distances than in the case of small distances. In the case of the detector areas exposed to received measurement radiation only in the case of small distances, therefore, the area of the individual light-sensitive elements can be reduced. In the detector regions in which the intensity of the received measurement radiation remains almost constant, the number of light-sensitive elements 101 contained in the individual pixels 111 can be increased with the area of the light-sensitive elements remaining the same.

Figure 4:
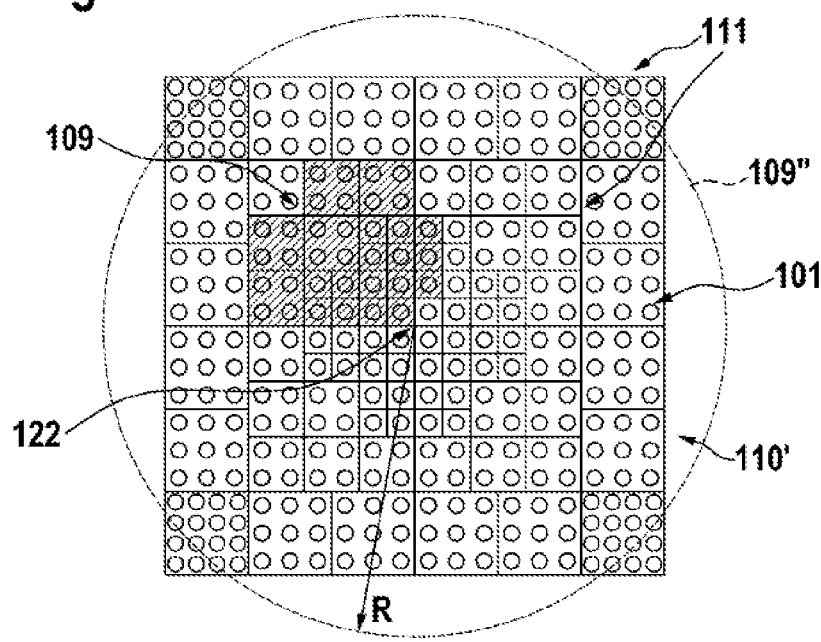
FIG. 4 shows a plan view of an alternative detection area of a receiving unit for a measuring device in accordance with one embodiment of the present disclosure.

FIG. 4 shows an embodiment of a detection area 110' for a coaxial laser distance measuring device or a laser distance measuring device with corrected parallax. Such a correction can be achieved with the aid of a near-range element or alternative, known methods. In such a case, the imaging aberration as a result of the finite depth of focus of the receiving optical unit substantially dominates, such that a concentric arrangement of the pixels having an identical size is advantageous. A laser beam returning from a target object far away is focused well and generates a relatively small laser spot 109 in the vicinity of the center 122 of the detection area 110', that is to say in the vicinity of the piercing point of the optical axis of the receiving optical unit through the detection area plane. A laser beam returning from a target object situated closer generates a laser spot 109" having a significantly larger diameter. In the vicinity of the center 122, the pixels 111 have a smaller area and a smaller number of light-sensitive elements 101 contained therein than at a distance from the center 122 of the detection area 110', that is to say at the edge of the detection area.

FIGS. 5 to 7 illustrate individual elements such as are used for realizing a receiving unit in accordance with embodiments of the present disclosure, as a block diagram.

FIG. 5 shows a pixel 111 having an individual light-sensitive element 101. The pixel is connected to a distance determining unit 130.

FIG. 6 shows two pixels 111, 111' each having a light-sensitive element 101, 101'. The pixels 111, 111' are connected to a multiplexer 140, which forwards the detection signals supplied by the pixels 111, 111' selectively to a distance determining unit 130.

FIG. 7 illustrates an arrangement of two pixels 111, 111' each having nine light-sensitive elements 101, 101'. The detection signals from the individual light-sensitive elements 101, 101' are, if appropriate after a temporal delay brought about by additional delay elements 150, 150', respectively forwarded to a combiner 160, 160'. The delay can serve for the compensation of propagation time differences and hence the temporal synchronization of the light-sensitive elements of one pixel or different pixels. The detection signals are combined with one another in the combiners 160, 160'. The combined detection signals are conducted from the combiners 160, 160' to a multiplexer 140 and from there on to a distance determining unit 130.

FIG. 8 shows a specific embodiment for a distance measuring device with corrected parallax using such elements for N=92 pixels 111. In this case, 48 pixels have only an individual light-sensitive element, 24 pixels each have four light-sensitive elements in a 2×2 arrangement, and 20 pixels each have 9 light-sensitive elements in a 3×3 arrangement. Each pixel 111 having more than one light-sensitive element 101 is exactly connected to one combiner 160, 160'. Accordingly, there are 44 combiners 160. The outputs of the pixels 111 having only one light-sensitive element and of the combiners 160 are connected to inputs of K multiplexers 140. The outputs of the multiplexers 140 are in turn connected to M≥2 distance determining units 130. In this case, it neither necessarily holds true that M=K nor that M=N. The connections for three pixels 111 having different sizes and numbers of light-sensitive elements are illustrated by way of example. An area illustrated in a hatched fashion in FIG. 11 indicates an effective detector area 170 comprising those pixels 111 which are actually illuminated by the laser light of the laser spot 109 and on the basis of which a distance measurement with respect to the target object can be carried out.

Finally, aspects and advantages of embodiments of the disclosure will be summarized again using different words:

One embodiment of the disclosure is based on the central concept of advantageously configuring the type of arrangement of individual light-sensitive elements in pixels whose signals are combined before they are fed to a temporal evaluation unit (having a plurality of distance determining units) for further evaluation. The amount of light-sensitive elements whose signals are combined by means of a combiner forms a pixel in this case.

The individual pixels can be operated independently of one another. In particular, it is possible to perform a phase evaluation of a continuous wave or alternatively a time-of-flight evaluation of a pulse for each individual pixel.

A combination of a plurality of light-sensitive elements to form pixels can be spatially configured in such a way that the signal-to-noise ratio can be optimized both in the case of large distances and in the case of small distances in particular with strong background illumination with a small number of distance determining units. This can be achieved by means of an adaptation—which is location-dependent over the detection area—of the size of the pixels or the number of light-sensitive elements which are combined to form a pixel.

The type of arrangement of optionally pixels having only one light-sensitive element or pixels having different sizes and numbers of light-sensitive elements, said type of arrangement being specifically optimized toward increasing the signal-to-noise ratio in a laser distance measuring device, constitutes one of the distinguishing features both with respect to conventional laser distance measuring devices and with respect to 3D cameras. This arrangement can reduce the requirements made of alignment of an optical unit within the measuring device and can simultaneously contribute to an optimized signal-to-noise ratio, even if the receiving unit does not lie in the image plane of the optical unit, as can occur in the case of fixed-focus systems, for example.

A detection area can be given dimensions large enough that the requirements made of the alignment of the receiving optical unit can be reduced. Moreover, it is possible to minimize the influence of optical imaging aberrations, in particular the aberrations as a result of defocusing on account of an excessively small depth of field. The requirements made of the optical quality of the receiving optical unit can be reduced as a result.

A further advantage can be the optimization of the signal-to-noise ratio particularly in the case of large measurement distances with a high proportion of background light. This can be achieved by virtue of the fact that the effective detection area for all distances can be optimally adapted to the size of the actually imaged laser measurement spot in the detection plane, that is to say can be minimized. After measurement has been concluded, the signals from exclusively those individual light-sensitive elements or pixels having a plurality of light-sensitive elements which actually receive laser radiation can be evaluated in a targeted manner. As a result, the effective detection area can be reduced and the noise contribution of the background light can be minimized, which can be tantamount to an improvement in the signal-to-noise ratio.

A further advantage may consist in the fact that fewer distance determining units than light-sensitive elements are required on account of the combination of a plurality of light-sensitive elements within a pixel. This can reduce a required chip area of an integrated circuit. Particularly in the case of laser distance measuring devices which generally operate with a fixed focal length, this advantage can play an important part since the laser spot diameter can then vary in a manner dependent on the distance of the target object. FIG. 6 illustrates this for a system in which the parallax error is not corrected. In order to optimize the signal-to-noise ratio as described above by minimizing the effective detection area, in the case of relatively large laser spot diameters, that is to say generally in the case of relatively small distances of the target object, accordingly only a relatively low resolution of the detector may be required as well. This circumstance can be utilized by the location-dependent combination of light-sensitive elements to form pixels.

Since the effective detection area, that is to say the area which is taken into account in the evaluation of the measurement, is generally smaller than the total detection area, the number of required distance determining units can be reduced even further by also employing multiplexing in addition to the combination of light-sensitive elements. With the aid of preliminary measurements, in this case the pixels receiving laser radiation can firstly be identified and subsequently be distributed among the distance determining units for the actual measurement. If N is the total number of pixels having one or more light-sensitive elements and M is the number of distance determining units available for evaluation, then it is necessary to carry out at most rounded-up N/M preliminary measurements for identification purposes. The measurement task can therefore be carried out with a small number of measurements, ideally with a single measurement.

A further advantage may reside in the fact that individual pixels can be calibrated independently of one another, for example with regard to a phase offset.

The invention claimed is:

1. A measuring device for optical distance measurement, in particular a handheld measuring device, comprising:
   a transmitting unit for emitting optical measurement radiation toward a target object;
   a receiving unit having a detection area for detecting optical measurement radiation returning from the target object; and
   an evaluation unit having at least one distance determining unit,
   wherein the detection area has a multiplicity of pixels,
   wherein each pixel has at least one light-sensitive element,
   wherein the evaluation unit is designed in such a way that detection signals of a plurality of pixels are forwarded to the at least one distance determining unit, on the basis of which the distance determining unit determines distance data which correlate with the distance between the measuring device and the target object, and
   wherein the evaluation unit is designed to determine a distance between the measuring device and the target object on the basis of an evaluation of distance data that were determined by the at least one distance determining unit.

2. The measuring device as claimed in claim 1, wherein the at least one distance determining unit is designed to determine a time of flight of measurement radiation between emission by the transmitting unit until detection of measurement radiation returning from the target object and to determine a distance therefrom.

3. The measuring device as claimed in claim 1, further comprising:
   at least one multiplexer configured to receive and forward detection signals of individual pixels sequentially to the at least one distance determining unit.

4. The measuring device as claimed in claim 2, wherein the evaluation unit is designed to determine the distance between the measuring device and the target object on the basis of the distances determined by the at least one distance determining unit.

5. The measuring device as claimed in claim 1, wherein at least some pixels each contain a plurality of light-sensitive elements.

6. The measuring device as claimed in claim 5, furthermore comprising:
   at least one combiner designed to combine detection signals of light-sensitive elements which are contained in an individual pixel.

7. The measuring device as claimed in claim 5, furthermore comprising:
   at least one pulse shortener in order to temporally shorten a digital signal generated by an SPAD.

8. The measuring device as claimed in claim 5, wherein the number of light-sensitive elements contained in a pixel varies depending on the location of the pixel within the detection area of the receiving unit.

9. The measuring device as claimed in claim 5, wherein an area of light-sensitive elements contained in a pixel varies depending on the location of the pixel within the detection area of the receiving unit.

10. The measuring device as claimed in claim 8, wherein:
    the transmitting unit and the receiving unit are arranged alongside one another along a parallax axis, and
    the number of light-sensitive elements contained in a pixel varies depending on the location of the pixel along the parallax axis.

11. The measuring device as claimed in claim 8, wherein the number of light-sensitive elements contained in a pixel is smaller in pixels near the transmitting unit than in pixels remote from the transmitting unit.

12. The measuring device as claimed in claim 8, wherein the number of light-sensitive elements contained in a pixel is smaller in pixels near the center of the detection area than in pixels remote from the center of the detection area.

13. The measuring device as claimed in claim 1, wherein the transmitting unit and the receiving unit are designed in such a way that a number of pixels which are illuminated simultaneously by optical measurement radiation returning from the target object varies in a manner dependent on a distance between the target object and the measuring device.

14. The measuring device as claimed in claim 1, furthermore comprising:
    a non-automatically focusing optical unit for directing optical measurement radiation returning from the target object onto the detection area.

15. The measuring device as claimed in claim 1, wherein the receiving unit and the evaluation unit are configured such that detection signals of individual pixels can be evaluated independently of detection signals of other pixels by the evaluation unit.

16. The measuring device as claimed in claim 1, wherein the receiving unit and the evaluation unit are configured to determine a distance between the measuring device and the target object on the basis of an evaluation of detection signals exclusively of pixels within an effective detection area, onto which light from that area of the target object which is illuminated by the transmitting unit is radiated back.

17. The measuring device as claimed in claim 1, furthermore comprising:
    at least one multiplexer configured to forward detection signals of a plurality of pixels selectively to the evaluation unit.

18. A handheld measuring device for optical distance measurement, comprising:
    a transmitting unit configured to emit optical measurement radiation toward a target object;
    a receiving unit having a detection area including a plurality of pixels configured to detect optical measurement radiation returning from the target object, each of the plurality of pixels including at least one light-sensitive element;
    an evaluation unit configured to route detection signals from the plurality of pixels to at least one distance determining unit, the distance determining unit configured to determine distance data which correlate with a distance between the measuring device and the target object, wherein the evaluation unit is configured to determine the distance between the measuring device and the target object by evaluating the determined distance data; and
    at least one multiplexer configured to receive detection signals from individual pixels of the plurality of pixels sequentially and forward the received detection signals to the at least one distance determining unit.

19. A handheld measuring device for optical distance measurement, comprising:
    a transmitting unit configured to emit optical measurement radiation toward a target object;
    a receiving unit having a detection area including a plurality of pixels configured to detect optical measurement radiation returning from the target object; and
    an evaluation unit configured to route detection signals from the plurality of pixels to at least one distance determining unit, the distance determining unit configured to determine distance data which correlate with a distance between the measuring device and the target object, wherein the evaluation unit is configured to determine the distance between the measuring device and the target object by evaluating the determined distance data, wherein a first plurality of the plurality of pixels include a plurality of light-sensitive elements, and the number of light-sensitive elements contained in each of the first plurality of the plurality of pixels varies depending on the location of each of the first plurality of the plurality of pixels within the detection area of the receiving unit.

20. The handheld measuring device as claimed in claim 19, furthermore comprising:
    a fixed focus optical unit configured to direct optical measurement radiation returning from the target object onto the detection area such that the optical measurement radiation is not focused on the detection area except for a target object located at a distance associated with a fixed focal length of the fixed focus optical unit.

* * * * *